Jan. 18, 1938. P. H. DAVEY 2,106,087
POWER TRANSMITTING APPARATUS
Filed July 23, 1936 3 Sheets-Sheet 1

Inventor
Paul H. Davey
Strauch & Hoffman
Attorneys

Jan. 18, 1938.  P. H. DAVEY  2,106,087
POWER TRANSMITTING APPARATUS
Filed July 23, 1936   3 Sheets-Sheet 2

Inventor
Paul H. Davey

By Strauch & Hoffman
Attorneys

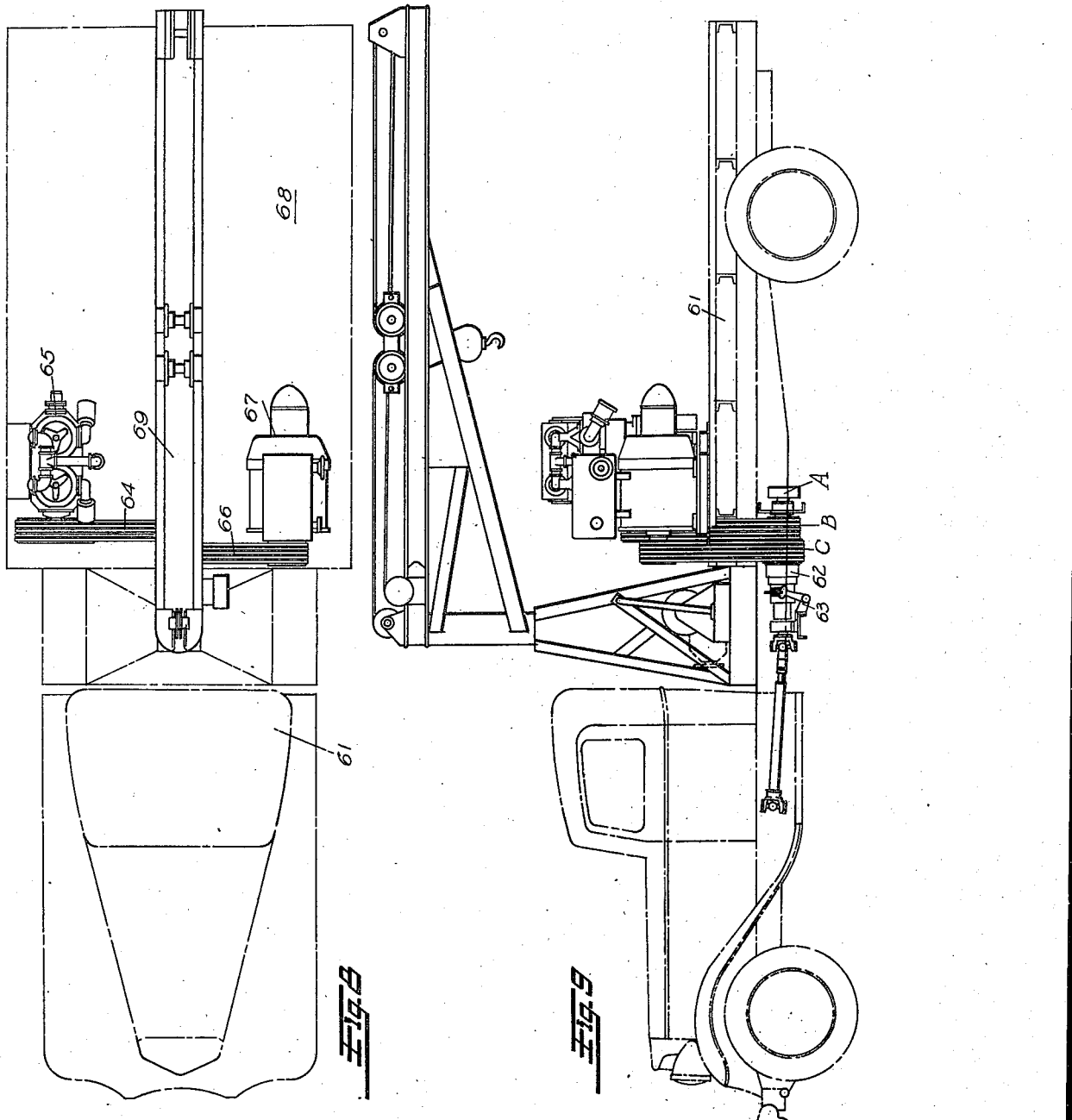

Patented Jan. 18, 1938

2,106,087

UNITED STATES PATENT OFFICE 2,106,087

POWER TRANSMITTING APPARATUS

Paul H. Davey, Kent, Ohio

Application July 23, 1936, Serial No. 92,214

11 Claims. (Cl. 74—11)

This invention relates to power transmitting apparatus and arrangements thereof with power converting units, and more particularly to novel power transfer means adapted for use in combination with power take-offs on automobile trucks, trailers or the like, and is an improvement over the apparatus disclosed in my copending application Ser. No. 702,993, filed December 18, 1933, which issued Aug. 18, 1936 as United States Patent No. 2,051,784.

In my copending Patent No. 2,051,784, a power transmitting apparatus is disclosed wherein a driving shaft is connected to a suitable source of power and arranged in combination with a shaft to be driven. In addition to the driven shaft, one or more power transmitting means such as pulleys, gears or the like are provided in combination with the driving shaft, clutching means being provided whereby either the driven shaft or either of the power transmitting means may be connected to the driving shaft to be driven thereby.

While such an arrangement is satisfactory in a large number of applications of power take-offs and similar devices, the arrangement is unsatisfactory in many instances, as for instance in the case of a plurality of power converting units mounted on a motor truck, combinations of air compressors and electric generators being widely used. With my prior arrangement, it is possible to operate either the truck, the compressor or the generator separately, but it is not possible to operate the compressor and generator at the same time or to operate either the compressor or generator while the truck is being driven.

In overcoming the aforesaid disadvantages, it is a major object of my invention to provide novel power transmitting means in combination with driving means, and a plurality of power transmitting elements preferably mounted in concentric relation to one another whereby either of the power transmitting elements can be operated from the driving means or selected combinations thereof can be driven simultaneously from the driving means.

A further object of my invention is to provide novel clutching means in combination with a driving means, a driven means and a plurality of power transmitting means whereby the former may be connected to drive the driven means or a power transmitting means individually or simultaneously drive a selected combination thereof.

Still a further object of my invention is the provision of novel clutching means in combination with a power take-off for a motor vehicle having a plurality of power converting units thereon, whereby the vehicle or either of the units may be driven by the engine of the vehicle, the vehicle may be driven in combination with one or more of the units, or the units may be driven simultaneously without driving the vehicle.

A further object of this invention resides in the provision of a novel and compact arrangement for power converting units mounted on a truck, trailer, or like vehicle with a single driving means wherein means is provided to selectively drive the units either individually or simultaneously.

A further object of the present invention resides in the provision of novel power transferring means for use in power transmitting mechanisms adapted for use on automotive vehicles, trailers and the like having power units thereon to be driven comprising a novel arrangement of clutch elements whereby the elements thereof may be reversed to provide for different driving combinations of the driving means with the different units.

Still a further object of this invention involves the provision of novel selective power transferring means in combination with a power take-off for automotive vehicles, trailers or the like wherein the mechanism is protected against dust, dirt and other foreign matter encountered by the vehicle in operation.

Other objects of the invention in addition to those above described will become apparent as the description proceeds in connection with the accompanying drawings wherein:

Figure 1 is a section of a preferred embodiment of the present invention illustrating the several clutching elements and their manner of operation in selectively driving the several power transmitting means.

Figures 2 to 7, inclusive, represent other preferred modifications of the clutching means of Figure 1 wherein different combinations of drive may be obtained.

Figure 8 is a plan of a motor vehicle embodying the present invention illustrating the manner in which a number of power converting units can be compactly located thereon.

Figure 9 is a side view of the vehicle of Figure 8.

Figure 1:
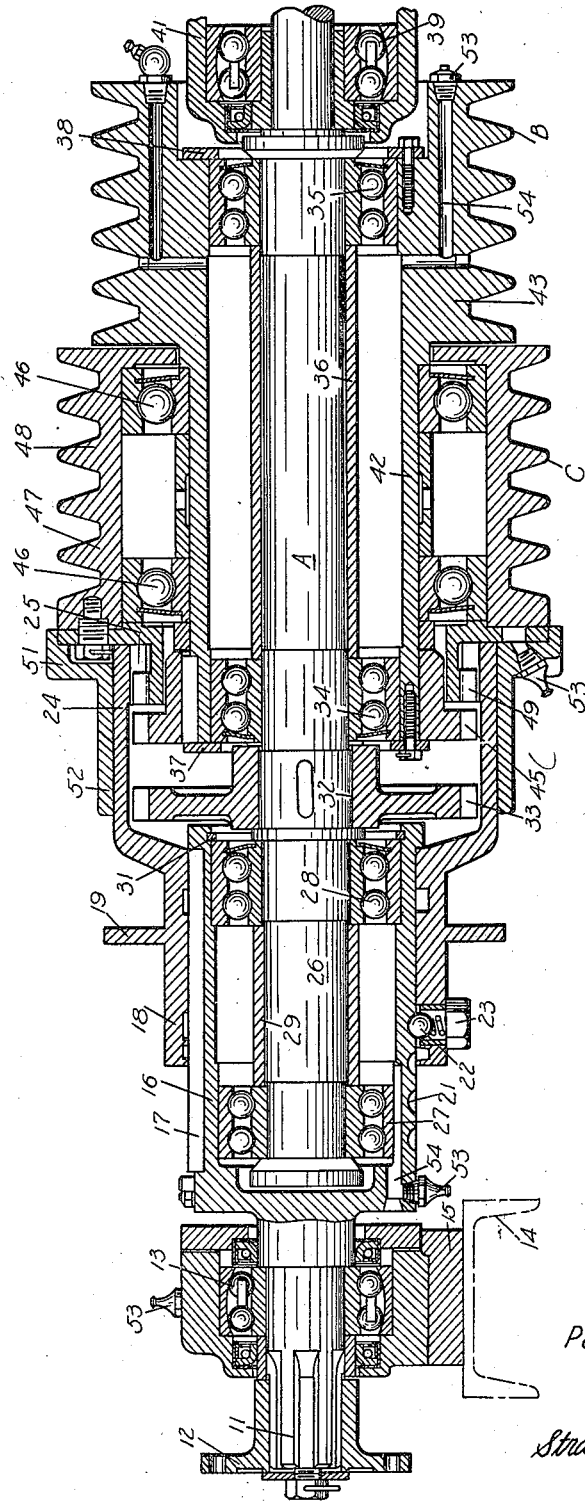

With specific reference to Figure 1 wherein a preferred embodiment of my invention is illustrated, 11 indicates a drive shaft arranged to be connected to a suitable source of power such as an engine when employed on a motor truck through a flange and collar arrangement 12, splined to the left end of shaft 11. Shaft 11 is supported in a bearing of the self-aligning type generally indicated at 13 which in turn is supported on a pillow block 15. Pillow block 15 is mounted on a cross member 14 which, in the case of an automotive vehicle, may be one of the frame members. Since the bearing construction is disclosed in detail in my copending Patent No. 2,051,784, a detailed discussion thereof in the present case is not considered necessary.

While for the purpose of illustration, the present invention will be described in connection with a truck, it is to be understood that the present invention is capable of application in other instances as in connection with a countershaft or similar power distributing means.

Shaft 11 is provided at its right end with an enlarged cup-shaped section 16 having a keyway 17 therein which receives a key secured to a sliding sleeve 18. Sleeve 18 is arranged to fit upon cup-shaped member 16 and to rotate therewith. Sleeve 18 is conveniently shifted by engagement of suitable levers or like shifting elements with a projecting flange 19.

To maintain the sleeve 18 in a desired position, a series of spherical notches 21 are provided in the outer surface of cup-shaped member 16, sliding sleeve 18 being provided with a ball 22 held in place by a spring and bolt assembly 23. When it is desired to shift sleeve 18, by reason of its round shape, ball 22 is released from the notch in which it is placed at the time of the shift and drops into the next notch as the sleeve moves thereover. This not only serves to lock sleeve 18 in place against accidental displacement but also insures its correct position in regard to the clutch combinations to be later described.

Sleeve 18 is enlarged at 24 and has an internal clutching element 25 mounted on the end thereof. A shaft 26 is positioned to be rotatably supported at one end by cup-shaped element 16 through bearing assemblies 27 and 28 which maintain shaft 26 in alignment with shaft 11.

As shown in Figure 1, bearing assemblies 27 and 28 are maintained in spaced relation and in fixed relation with respect to shaft 26 and cup 16 by means of a collar 29 and a securing ring 31 secured in a suitable notch in cup 16. Shaft 26 is further provided with a splined or keyed portion 32 upon which a clutching element 33 is mounted to rotate therewith. To the right of clutching element 33, bearing assemblies 34 and 35 are provided on shaft 26, a spacing collar 36 being provided therebetween. Collars 37 and 38, suitably bolted or otherwise secured, are employed to maintain bearings 34 and 35 in their correct positions.

A self-aligning bearing 39 is provided to support the right end of shaft 26, bearing 39 being generally similar to bearing 13. Bearing 39 is supported from the vehicle or other supporting means (not shown) through a collar 41 which is secured to the supporting means by a flange and bolts or similar means not shown. A sleeve 42 is mounted to rotate on bearings 34 and 35 and comprises a section 43 to receive a belt connected to a power converting unit or other desired mechanism. It will be understood that instead of pulley 43, a gear or similar power transmitting element may be substituted therefor. At the left end of sleeve 42, a clutching element 45 is provided which is keyed or otherwise secured to rotate with sleeve 42, clutching element 45 being held on the shaft by collar 37. Sleeve 42, with pulley 43 and clutching element 45, comprises a power transmitting element hereinafter to be called unit B.

Bearings 46 are provided on the outer surface of sleeve 42, the bearings being spaced and held in proper position by suitable collars to support a second power transmitting element 47 (hereinafter called unit C) for rotation thereon, power transmitting element 47 being provided with a pulley 48 of the same general character as pulley 43. A clutching element 49 is secured to element 47 at the left end thereof as by bolts or similar means for a purpose to be later described.

Clutching elements 25, 33, 45 and 49 may be of any desired construction, but preferably are of suitable toothed or gear design.

To seal the apparatus against the access of dirt, dust and other foreign matter, a sealing member 52, secured by a flange 51 to power transmitting element 43, extends around the right end of sleeve 18 to protect the clutching elements and other rotatable elements therein.

Assuming that shaft 11 is being driven by a suitable source of power, it is evident that power is transmitted in turn from shaft 11 through cup 16 and sleeve 18 to clutching element 25. In the position shown in Figure 1, the clutching element 25 is in engagement with only the clutching element 49 and drives only the power transmitting element 47 or unit C.

When the sleeve 18 is shifted to the left so that the ball 22 occupies the next notch 21, the clutching element 25 which, it will be noted, is approximately twice the width of clutching elements 33, 45 and 49, will engage both clutching element 45 and clutching element 49 to drive units B and C. When the sleeve 18 is shifted to the left so that the ball 22 falls into the next succeeding notch, clutching element 25 will be in engagement only with clutching element 45, and only unit B will be driven. When sleeve 18 is shifted to the left so that ball 22 occupies the next notch 21, clutching element 25 will be only in engagement with clutching element 33 to effect the drive of shaft 26, hereinafter called unit A. Thus it is evident that the clutching arrangement disclosed in Figure 1 provides means whereby shaft 26 or unit A may be driven alone, and power transmitting element 42 or unit B can be driven alone, power transmitting elements 42 and 47 (units B and C) can be driven simultaneously, and power transmitting element 47 (unit C) can be driven alone.

When employed upon an automotive vehicle, shaft 26 usually constitutes a portion of the propeller shaft of the vehicle and is connected to drive the wheels thereof, the pulleys 43 and 48 being connected to suitable power converting units such as air compressors, generators, grinders, winches or the like.

With reference to Figures 2 to 7, inclusive, I have shown preferred modifications of the clutching arrangements shown in Figure 1 where different combinations of drives can be obtained, no sacrifice being made in the simplicity or compactness of the assembly.

Figure 2:
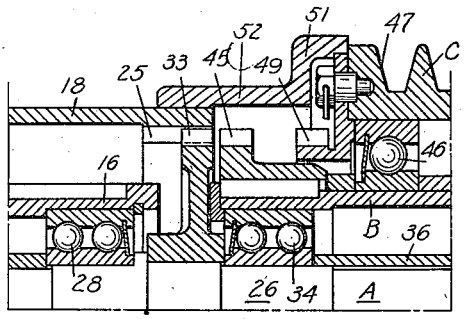

In the modification shown in Figure 2 I have provided a clutching arrangement wherein either of the three units A, B and C, may be driven alone or the units A and B may be simultaneously driven. This is possible through the provision of a clutching element 25 of relatively double width on sleeve 18, the position of clutching elements 33 and 45 in adjacent relation and the spacing of clutching elements 45 and 49. With sleeve 18 in the position shown in Figure 2, the drive is to unit A (shaft 26) through clutching elements 25 and 33. When sleeve 18 is shifted one notch to the right, clutching element 25 is of a width to simultaneously engage clutching elements 33 and 45 whereupon both units A and B will be driven. Upon movement of sleeve 18 one more notch to the right, clutching element 25 will become disengaged from clutching element 33 and will engage only clutching element 45 whereupon only unit B will be driven. Upon further movement to the right, clutching element 25 will be in engagement only with clutching element 45 to drive unit C.

Figure 3:
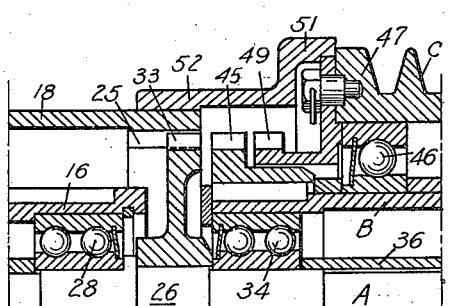

Referring to Figure 3, the clutching arrangement there shown is such that unit A may be driven alone, unit C may be driven alone, or unit B can be driven simultaneously with either unit A or unit C. For example, when clutching element 25 of sleeve 18 is in the position shown in Figure 3, only clutching element 33 will be engaged by the clutching element 25 to drive unit A. When sleeve 18 is shifted one notch to the right, clutching element 25 will engage clutching element 33 and clutching element 45 to drive units A and B. When sleeve 18 is shifted one more notch to the right, clutching elements 45 and 49 will be simultaneously engaged by clutching element 25 to drive units B and C simultaneously. Further movement of sleeve 18 to the right will result in engagement only of clutching elements 25 and 49, whereupon only unit C will be driven. In this modification it will be noted that clutching elements 33, 45 and 49 are disposed adjacent to each other and a clutching element 25 of relatively double width is employed on sleeve 18.

Figure 4:
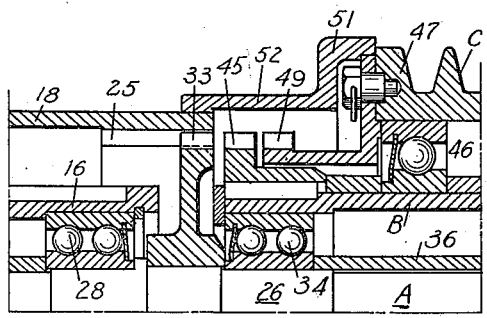

Referring to Figure 4, I have shown a modified clutching arrangement wherein units A and C may be driven alone, units A and B or B and C may be driven simultaneously, and units A, B and C can be driven simultaneously. This is accomplished by the provision of clutching element 25 of a width approximating the width of three clutching elements like clutching element 33, clutching element 25 in the position shown in Figure 4 being arranged to drive only clutching element 33 and unit A. When sleeve 18 is shifted one notch to the right, both clutching elements 33 and 45 are engaged by clutching element 25 and units A and B are driven. When sleeve 18 is shifted one more notch to the right, clutching elements 33, 45 and 49 are simultaneously engaged by clutching element 25 to effect driving of all units A, B and C. Further shifting of clutching element 25 disengages the clutching element 33 so that only clutching elements 45 and 49 are driven to drive units B and C simultaneously. Further movement of sleeve 18 to the right disengages clutching elements 25 and 45 until only clutching element 49 is engaged by the clutching element 45 to drive the unit C.

Figure 5:
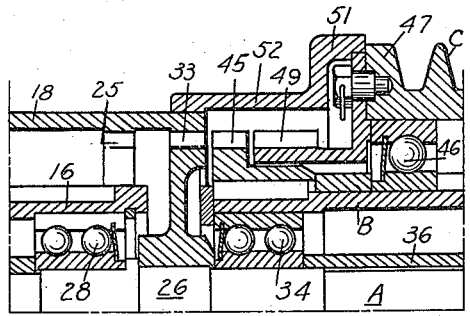

In the arrangement shown in Figure 5, a number of spaced clutching elements 25 on the sleeve 18 are shown and clutching element 49 is of approximately two clutching element widths. This arrangement permits a drive of either units A, B and C alone, a simultaneous drive of units A and C, and a simultaneous drive of units B and C.

In the position shown in Figure 5, the right section of clutching element 25 engages clutching element 33 to drive only unit A. Movement of sleeve 18 one notch to the right causes the engagement of the right section of clutching element 25 with clutching element 45 which accomplishes driving of unit B. Further movement of sleeve 18 to the right engages the right section of clutching element 25 with clutching element 49 and the left section of clutching element 25 with clutching element 33, thus resulting in simultaneous drive of units A and C. In this position clutching element 45, connected to unit B, occupies the space between the two sections of clutching element 25 on sleeve 18. Further movement of sleeve 18 to the right engages the right section of clutching element 25 with the right half of clutching element 49 and engages the left section of clutching element 25 with clutching element 45 whereby simultaneous drive of units B and C is had. Still further movement of sleeve 18 to the right results in a transfer of the right section of clutching element 25 to the space between the end of clutching element 45 and unit 47 and engagement of the left section of clutching element 25 with the left half of clutching element 49 whereby only unit C is driven.

Figure 6:
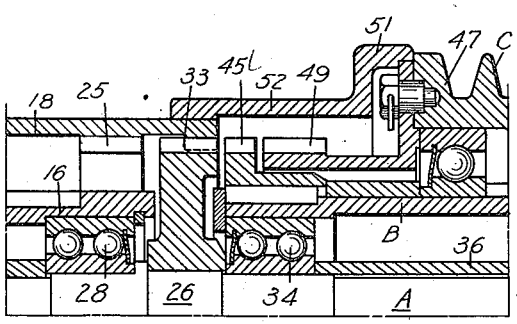

Figure 6 illustrates a clutch assembly wherein by the employment of clutching elements of various widths and spacings a multiplicity of different combinations of drive can be obtained. In the assembly there shown, it is possible to drive either unit A or unit C alone, to drive unit A either simultaneously with unit B or C, to drive units A, B and C simultaneously, or to drive units B and C together. As will be noted, the internal clutching element 25 comprises a left section of approximately two clutching element widths and a right section of a single width, a space of approximately one clutching element width being interposed therebetween. Clutching elements 33 and 49 are of relatively double clutching element width.

In the position shown in the drawings, the right section of clutching element 25 is in engagement with the right half of clutching element 33 to drive only unit A. When the shaft 18 is moved to the right approximately one clutching element width, the right section of clutching element engages clutching element 45 to drive unit B while the right half of the left section of clutching element 25 engages the left half of clutching element 33 to drive unit A. Movement of the sleeve 18 one notch to the right engages the right section of clutching element 25 with gear 49 to drive unit C and the left section of clutching element 25 to engage clutching element 33 to drive unit A, clutching element 45 being positioned in the space between the two sections of clutching element 25. Further movement of sleeve 18 to the right moves the right section of clutching element 25 into contact with the right half of clutching element 49 and positions the left section of clutching element 25 in engagement with both clutching elements 45 and 33 to drive units A, B and C simultaneously. Further movement to the right of sleeve 18 frees the right section of clutching element 25 from engagement with clutching element 49 and moves the left section of clutching element 25 into engagement with clutching elements 45 and 49 whereby simultaneous drive of units B and C is had. Further movement of sleeve 18 to the right disengages the left section of clutching element 25 and clutching element 45 and completely engages the clutching element 25 and clutching element 49 to drive only unit C.

Figure 7:
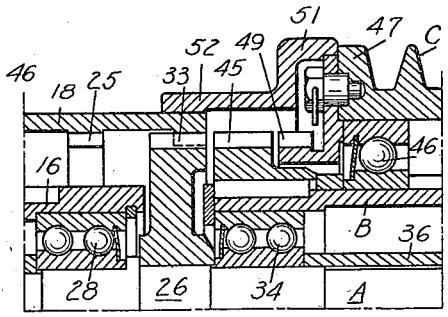

Figure 7 illustrates an arrangement wherein spaced clutching elements of single width are provided on the sleeve 18, clutching elements of double width being provided on units A and C. This arrangement permits of a drive of units A and B alone or a combination drive of units A and B or A and C, simultaneously. In the position shown in the drawings, the right section of clutching element 25 is engaged with clutching element 33 to drive only unit A. When the sleeve 18 has moved one clutching element width to the right, the right section of clutching element 25 engages the left half of clutching element 45 to drive only the unit B. Further movement of sleeve 18 engages the right section of clutching element 25 with the right half of clutching element 45 and the left half of clutching element 25 with the left half of clutching element 33 to drive both units A and B. Further movement of sleeve 18 to the right engages the right portion of clutching element 25 with clutching element 49 to drive unit C and the left section of clutching element 25 with the right half of clutching element 33 to drive the unit A thus resulting in a combination drive of units A and C, clutching element 45 being contained between the spaced clutching elements 25 and not being driven.

It will be noted in connection with some modifications of my invention as between those shown in Figures 1 and 2, it is possible by reversing a clutching element such as clutching element 33 to change the combinations of drive. This is an advantage in both manufacture and subsequent use since it permits a multiple use of the one element and affords a simple method of changing the combinations of drive.

In Figures 8 and 9 I have illustrated a preferred application of a power take-off of the present invention to an automotive vehicle wherein the advantages thereof are apparent. In Figures 8 and 9 wherein an automobile truck is indicated at 61, a power take-off in accordance with the present invention is shown at 62, a shift therefor being provided at 63. Unit A is connected to drive the wheels of the vehicle by well known means, unit B being connected by a belt 64 to an air compressor 65. Unit C is connected by a belt 66 to a generator 67. It will be noted that the compact arrangement shown leaves a relatively large cargo space shown at 68 and also provides room for a crane 69. Such a compact arrangement is entirely new in the art and, as will be readily appreciated, is a means of great economy in operation.

While the power take-off of the present invention has been described only in connection with three driven units, it is to be understood that other driven units may be added thereto to drive additional power means that may be placed upon a truck body, or be otherwise supported with reference to the power take-off.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power transmitting mechanism comprising a driving shaft, a power transmitting element rotatably mounted on said driving shaft, a second power transmitting element rotatably mounted on said first power transmitting element, a third power transmitting element rotatably mounted on said second power transmitting element, and means to selectively connect said driving shaft to any of said power transmitting elements or to a plurality thereof simultaneously.

2. A power transmitting mechanism comprising a driving shaft, a driven shaft rotatably mounted on said driving shaft, a power transmitting element rotatably mounted on said driven shaft, a second power transmitting element rotatably mounted on said first power transmitting element, clutch elements on each of said power transmitting elements and said driven shaft, and selective clutch means on said driving shaft to selectively engage the clutch elements on said driven shaft or either of said power transmitting elements or the clutch elements on said driven shaft and one of said power transmitting elements simultaneously or the clutch elements of both said power transmitting elements simultaneously.

3. A power transmitting mechanism comprising a driving shaft, a power transmitting element, a second power transmitting element rotatably mounted on said first power transmitting element, a third power transmitting element rotatably mounted on said second power transmitting element, clutch elements on each of said power transmitting elements, and a clutch element on said driving shaft, the latter being of a width to simultaneously engage the clutch elements on two of said power transmitting elements when shifted to a predetermined position and to engage the clutch elements on only one of said power transmitting elements when shifted to a different predetermined position.

4. A power transmitting mechanism comprising a driving shaft, a power transmitting element, a second power transmitting element rotatably mounted on said first power transmitting element, a third power transmitting element rotatably mounted on said second power transmitting element, external clutching elements on each of said power transmitting elements, and a series of spaced and shiftable internal clutching elements on said driving shaft, the latter being arranged to simultaneously engage the clutching elements on at least two of said power transmitting elements when shifted to a predetermined position, and to engage the clutching element on only one of said power transmitting elements when shifted to a different predetermined position.

5. A power transmitting mechanism comprising a driving shaft, a power transmitting element, a second power transmitting element rotatably mounted on said first power transmitting element, a third power transmitting element rotatably mounted on said second power transmitting element, irregularly spaced external clutching elements on each of said power transmitting elements, and a shiftable internal clutching element on said driving shaft, the latter being arranged to simultaneously engage the clutching elements on two of said power transmitting elements when shifted to a predetermined position, and to engage the clutching elements on only one of said power transmitting elements when shifted to a different predetermined position.

6. A power take-off for a motor truck or the like to drive a plurality of units on said truck from the truck engine comprising a driving shaft driven by the engine, a power transmitting element connected to the wheels of said truck and power transmitting elements connected to each of said units on said truck, said power transmitting elements being concentrically mounted with respect to one another and said driving shaft, and means to selectively connect said driving shaft to any of said power transmitting elements or to a plurality thereof simultaneously.

7. A power take-off for a motor truck or the like to drive a plurality of units on said truck from the truck engine comprising a driving shaft driven by the engine, a driven shaft connected to drive the wheels of said truck and power transmitting elements connected to drive each of the units on said truck, clutch elements on each of said power transmitting elements and said driven shaft, and selective clutch means on said driving shaft to engage the clutch elements on said driven shaft or either of said power transmitting elements or the clutch elements on said driven shaft and one of said power transmitting elements simultaneously or the clutch elements of both said power transmitting elements simultaneously whereby said truck may be moved while simultaneously driving either of said units or said units can be simultaneously or individually driven when said truck is not being driven.

8. A power transmitting mechanism comprising a driving shaft and a plurality of power transmitting elements, clutching means on said shaft and said elements whereby said shaft may be connected to drive a plurality of said elements simultaneously, said clutching means on said elements including a reversible clutching member with an offset hub thereon whereby upon reversing the position of said member, the combinations of drives can be varied.

9. A power transmitting mechanism comprising a driving shaft, a driven shaft and a plurality of power transmitting elements, clutching means on said shaft and said driving elements whereby said shaft may be selectively connected to said driven shaft and said elements and means secured to one of said power transmitting elements for protecting said clutching means against foreign matter and accidental injury.

10. A power transmitting mechanism comprising a driving shaft, a power transmitting element, a second power transmitting element rotatably mounted on said first power transmitting element, a third power transmitting element rotatably mounted on said second power transmitting element, spaced clutching elements on each of said power transmitting elements, and a series of shiftable clutching elements on said driving shaft, the latter being arranged to simultaneously engage the clutching elements on at least two of said power transmitting elements when shifted to a predetermined position, and to engage the clutching element on only one of said power transmitting elements when shifted to a different predetermined position.

11. A power transmitting mechanism comprising a driving shaft, a power transmitting element, a second power transmitting element rotatably mounted on said first power transmitting element, a third power transmitting element rotatably mounted on said second power transmitting element, clutching elements on each of said power transmitting elements and shiftable clutch means on said driving shaft, said clutch means being adapted to simultaneously engage the clutching elements on all of said power transmitting elements when shifted to a predetermined position, and to engage the clutching element on only one of said power transmitting elements when shifted to a different predetermined position.

PAUL H. DAVEY.